May 11, 1965 A. W. VINAL 3,183,493

MAGNETIC DEVICES

Filed June 29, 1960 3 Sheets-Sheet 1

INVENTOR
ALBERT W. VINAL

BY Ralph R. Barnard
ATTORNEY

United States Patent Office 3,183,493
Patented May 11, 1965

3,183,493
MAGNETIC DEVICES

Albert W. Vinal, Owego, N.Y., assignor to International Business Machines Corporation, New York, N.Y., a corporation of New York Filed June 29, 1960, Ser. No. 39,476
8 Claims. (Cl. 340—174)

This invention relates to magnetic devices and more particularly to a magnetic device having two stable magnetic-reluctance (coercive) information states.

Electrical devices having two stable states are well known in the art and have been the fundamental component in digital, logic, control, memory and storage systems. Broadly, these electrical devices may be considered in two general categories. The first is the destructive type meaning that the information is destroyed during the interrogation of its state. The other is the non-destructive type meaning that its information state is not changed when that information state is interrogated. One example of the destructive electrical device used for information storage is the toroidal core of square loop magnetic material, which may be switched from its positive magnetic remanent condition to its negative magnetic remanent condition and vice versa to selectively represent the two states necessary for defining binary digital information. These toroids together with electrical windings may be utilized singularly and plurally as logic, control and storage devices. These toroidal cores have the fundamental shortcoming that when used as the aforementioned, it is necessary to change the magnetic remanent condition within the toroidal core (or equivalent) during a reading (or interrogation) operation thereby destroying the binary condition stored therein. Accordingly, when it is desired to maintain the binary condition stored within the magnetic element, a writing operation must follow each reading operation. This operational requirement results in a substantial increase in the instrumentation equipment required by a magnetic logic or memory system. Furthermore, the power consumption and time required for a complete operating cycle is substantially increased.

Examples of the non-destructive electrical device having two stable states usable to store information for logic, control or memory purposes are a relay operated switch with means for holding it in a closed condition as desired, an electronic flip-flop and a magnetic multi-apertured device known as the transfluxor.

The aforementioned prior art relay operated switch with a holding feature represents a highly desirable information storage non-destructive type device in that when it is in the closed condition it transmits interrogating signal information through its switch contacts with a low power loss and at the same time the closed condition of the switch contacts is not altered by the interrogating signal. On the other hand, when the relay operated switch is in its open condition, the interrogating signal sees a very high impedance and at the same time the open condition of the switch is not altered by the interrogating signal regardless of its amplitude. In addition, the plural relay operated switches may be arranged in a matrix for identification by coordinates and selected by address windings using conventional coincidence current techniques. As is well known to those skilled in the art, the use of such a coincidence current addressing system often reduces the complexity and number of components of the addressing system of an information matrix. The relay operated switch is particularly adaptable to coincident current information matrices because:

(1) The energization level at which the relay "picks" is ascertainable for a particular design and the half select energization level on one coordinate can be designed to approach and not exceed that amount, (2) The interrogation of the switch contacts to ascertain, whether or not it is in its open or closed condition, does not in any way affect or destroy that condition, and (3) The energization of the relay coil to open or close the switch contacts does not in itself generate an output signal.

Notwithstanding these aforementioned advantages of the relay operated switch as an information storage device having an indestructible characteristic, information matrices made therefrom have the following disadvantages: First, the speed or repetition rate at which electromechanical devices of this type can be made to operate is decidedly limited by its mechanical properties. Secondly, in addition to the speed limitation, the electromechanical operation also sets limits on the physical volume thereby reducing volumetric efficiency. Finally, the power requirement of an information matrix comprising relay operated switches is substantial.

To provide for the operational requirements of modern computers, the aforementioned transfluxor device was developed. Briefly, the transfluxor device of the prior art comprises a round slab of magnetic material having a nearly rectangular (square) hysteresis loop with a major aperture causing it to appear like a toroid. In addition, a minor aperture of smaller diameter is located substantially in the middle of the toroidal path at one point therealong. A control (blocking) winding is passed through the major aperture, and an interrogation (read) winding and a sense winding are passed through the minor aperture. The core is placed in one stable reluctance (coercive) condition by passing a sufficiently large current pulse of a first polarity through the control winding, so as to saturate the whole toroidal magnetic path including the inner and outer legs adjacent the minor aperture in a corresponding direction. This stable magnetic reluctance condition is often referred to as the blocked state because the magnetic flux passing around the major aperture within the inner and outer legs formed by the minor aperture is saturated in the same direction. Current pulses applied to the interrogating winding of alternate polarities and relatively substantial magnitudes are not able to change the flux linkage around the minor aperture, so that no substantial voltage is induced in the sense winding.

Following one mode of operation, the transfluxor type two-aperture toroidal core may be placed in the other stable magnetic reluctance state by applying a current pulse having the other polarity (opposite to the control pulse initiating the blocked condition) either through the control winding or alternatively through an additional set winding passed through the major aperture. This latter current pulse is applied for the purpose of reversing the inner band of magnetic flux around that aperture. Thereafter, a current pulse of sufficient magnitude and proper polarity is passed through the interrogating winding for reversing the flux around the minor aperture and forcing the flux around the major aperture to fold back on itself forming a pattern known to those skilled in the art as a "kidney pattern." As a result of the formation of the kidney pattern, a complete flux path of relatively low reluctance to flux reversals is present around the minor aperture. Therefore, alternate bipolar pulses through the interrogating winding will successively reverse the flux around the minor aperture and induce voltage pulses in the sense winding in a transformer-type operation.

Alternatively, following a second mode of operation, the reversal of the inner band around the major aperture by the setting operation may be eliminated. The initial current pulse through the interrogating winding may be of sufficient magnitude and opposing polarity to cause the kidneying action of the flux around the major aperture.

Accordingly, the blocked condition, wherein both the inner and outer legs around the minor aperture are saturated in the same direction so that a transformer action between the interrogating and sense windings is not possible, represents one of the stable magnetic reluctance states. The unblocked condition represents the other stable magnetic reluctance state when the flux around the minor aperture may be reversed by alternate bipolar current pulses applied to the interrogating winding so as to induce corresponding voltages in the sense winding.

By way of analogy, the blocked condition of the transfluxor corresponds to the open switch condition of the relay operated switch, and its unblocked condition corresponds to the closed switch condition of the relay operated switch. In other words, when there is no transformer action between the read (interrogating) winding and the sense winding of the transfluxor, it may be said that the switch is open with respect to alternate bipolar pulses. When there is a substantial transformer action between the read winding and the sense winding of the transfluxor, it may be said that the switch is closed with respect to the alternate bipolar pulses.

While the transfluxor device is a considerable improvement over the relay as an information device having two stable states, particularly with respect to the speed of operation in going from one stable state to the other, the continuing vast increase in speed requirements in computers made their use undesirable from that standpoint. Moreover, the power requirements of the transfluxor remain relatively high because of the large diameter of the control aperture and the large amount of flux which has to be alternately reversed. In addition, the large diameter of the control aperture resulted in a magnetic device which was relatively large and circular along its outside boundary, so as to result in the inefficient use of volume when the transfluxor was arranged in a memory matrix array. Furthermore, when a transfluxor was driven from blocked to an unblocked state by the application of a magnetomotive force around the control aperture, the energy contained in the first current pulse applied to the read winding was partially consumed in finalizing the unblocked state (kidney pattern around the control aperture) and limited the magnitude of the first induced voltage in the sense winding. This shortcoming of the transfluxor materially limited the speed capabilities of a transfluxor information matrix, the first time a coincidentally selected transfluxor element was interrogated to determine whether it was in the unblocked state. Still another disadvantage of the transfluxor is that the magnetomotive force (current pulse amplitude) applied around the major aperture is different in going from the blocked to unblocked condition and vice versa.

The aforementioned disadvantages of the transfluxor were due in a large measure to the relatively large diameter of the control aperture. In turn, it was the large diameter of the control aperture which allowed relatively large amplitude alternate bipolar pulses to be applied to the read winding to determine the state of the transfluxor without raising the undesirable possibility that a threshold would be exceeded such as to destroy the blocked condition, if present.

In contrast to the above-state shortcomings of the prior art transfluxor type devices, a magnetic device was described in copending application Serial No. 823,525, and now abandoned, entitled "Non-Destructive Magnetic Memory," inventors J. A. Coffin and A. W. Vinal, filed June 29, 1959, which is assigned to the same assignee as the present application. Therein, there was described a magnetic device having two stable reluctance conditions requiring a minimum amount of energy and power to switch from one stable state to the other. Because a smaller amount of energy was required, the switching action required a substantially shorter time period. Furthermore, the device made efficient use of the active ferrite material around an aperture pair within a physically bounded or unbounded geometrical configuration. Specifically, the above-identified co-pending application described a magnetic device using a pair of apertures within a magnetizable material having substantially equal diameters with a control winding passing through one aperture designated control aperture and a read winding and sense winding passing through the other aperture, designated as a read aperture. To put the magnetic pair in the blocked condition, the polarity of the current pulse applied to the control winding is selected so as to derive a flux having a direction corresponding to the direction of the flux existing at the remote edge of read aperture so that a minimum current pulse amplitude (minimum magnetomotive force) is required to put the aperture pair in a blocked condition. Stated differently, the magnitude of the current pulse applied to the control winding need only provide sufficient magnetomotive force to saturate the magnetic material between the two apertures. The reduction of the magnetomotive force required (compared to that required in a transfluxor type device) to put the cooperating aperture pair in a blocked condition materially changes the resultant flux pattern within the magnetizable material. For example, the total active magnetic material is no longer circular in shape but has the general appearance of a pulley. This "pulley pattern" represents a minimum of active magnetic material which may be used to derive a blocked condition while at the same time consuming a minimum of electrical energy. This active magnetic material around an aperture pair appearing as a pulley represents the minimum physical size for the magnetic device, and its shape lends itself for making the most efficient use of space in a memory array whether the memory elements are in a bounded or unbounded geometrical configuration.

As a result of this particular geometrical configuration (control and read apertures having substantially the same diameters), if the alternate bipolar current interrogating pulses being applied through the read aperture were made large in an effort to provide a desirable "one/zero" ratio, the pulley pattern of flux which exists around both apertures during the blocked condition is subject to being destroyed. Stated differently, care had to be exercised during the reading operation to avoid destroying the information stored in the device. This degree of care results in limiting the "one/zero" output signal ratio, absolute amplitude of the unblocked output signal and speed capabilities for the reading operation, which are often even more important characteristics of a memory than the electrical energy consumed in its operation.

Therefore, it is a primary object of the present invention to provide a new and improved magnetic device having two stable magnetic reluctance (coercive) conditions.

It is another object of the present invention to provide a new and improved magnetic device having two stable states wherein each stable state may be interrogated without changing that state.

It is still another object of the present invention to provide a new and improved magnetic device wherein each stable reluctance condition may be interrogated without changing that state even though the amplitude of the alternate bipolar pulses applied to the read windings is relatively large.

It is an additional object of the present invention to provide a new and improved magnetic device having two stable states wherein each stable state may be nondestructively interrogated with a short access time.

It is still another object of the present invention to provide a new and improved two-apertured magnetic device having two stable states wherein a current bias prevents the adverse switching of flux at the inner wall of one aperture thereby preventing the undesirable destruction of a stable state.

It is another object of the present invention to provide a new and improved magnetic device having two stable states wherein each stable state may be interrogated without changing that state by the application of an energizing magnetomotive force having an amplitude which need not be closely regulated.

The foregoing and other objects, features and advantages of the invention will be apparent from the following more particular description of a preferred embodiment of the invention, as illustrated in the accompanying drawings.

The objects of the present invention are provided by a new and improved magnetic device comprising two adjacent apertures of approximately equal diameters within square-loop, square-knee magnetic material wherein a biasing magnetomotive force is applied to the inner wall of the magnetic material around one aperture while a reading or control current pulse of proper polarity is applied to the magnetic material around the other aperture.

Figure 2:
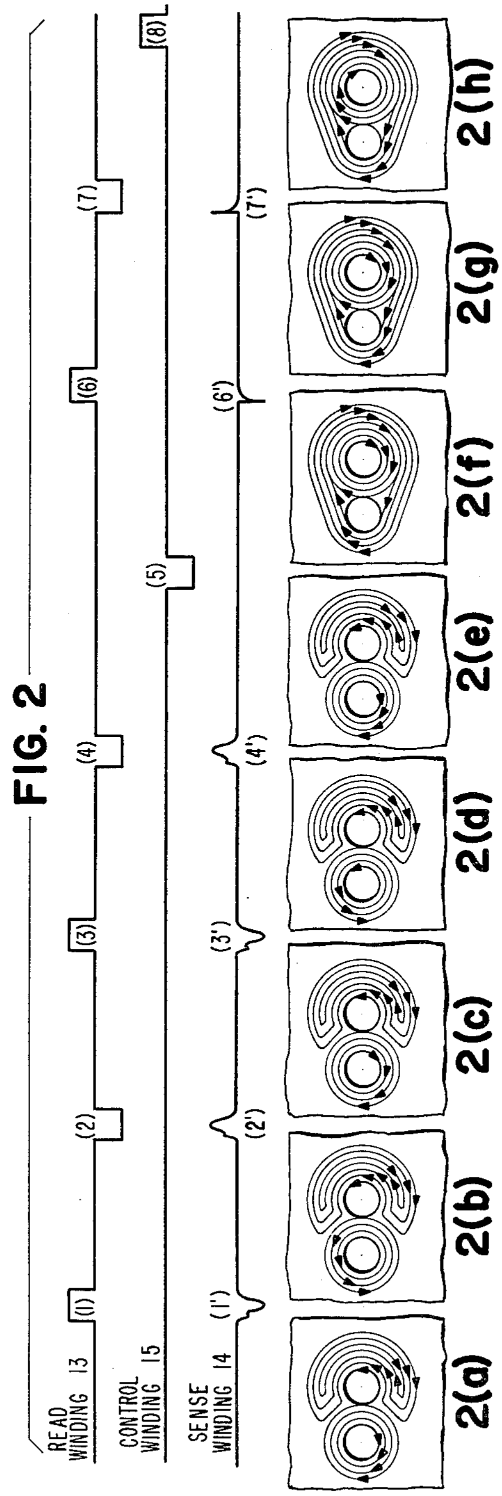
FIG. 2 shows exemplary bipolar current waveforms applied to the windings of FIG. 1.
Figure 1:
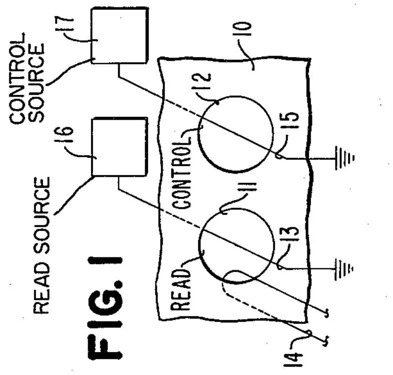
FIG. 1 shows a pair of adjacent apertures cooperating within an unbounded slab of magnetizable material having one or more windings passing therethrough for providing a magnetic device with two stable magnetic reluctance conditions according to the teachings of the above-identified co-pending application.
Figure 8:
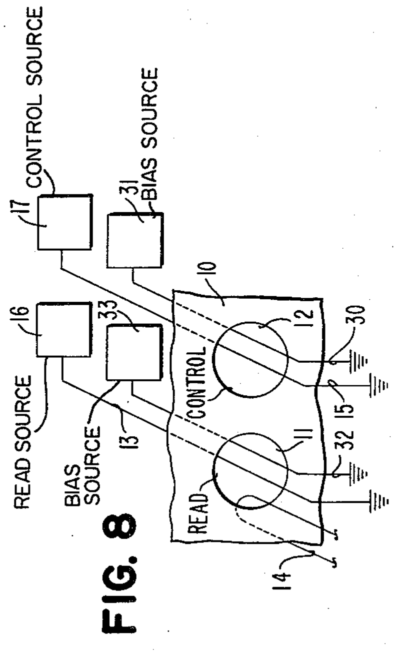
Figure 4:
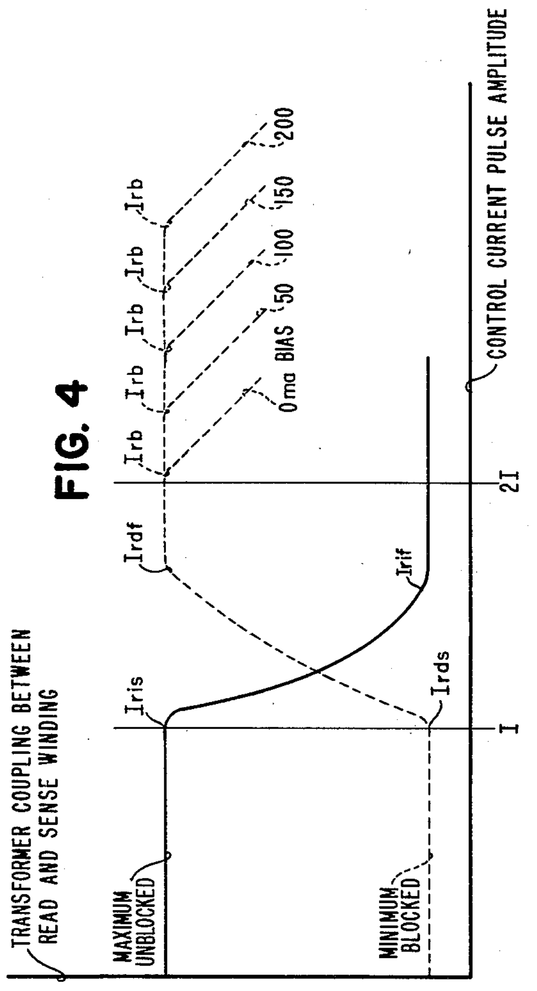
Figure 3:
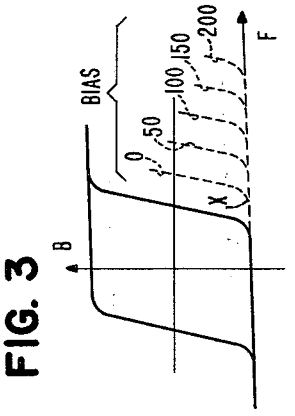
Figure 7:
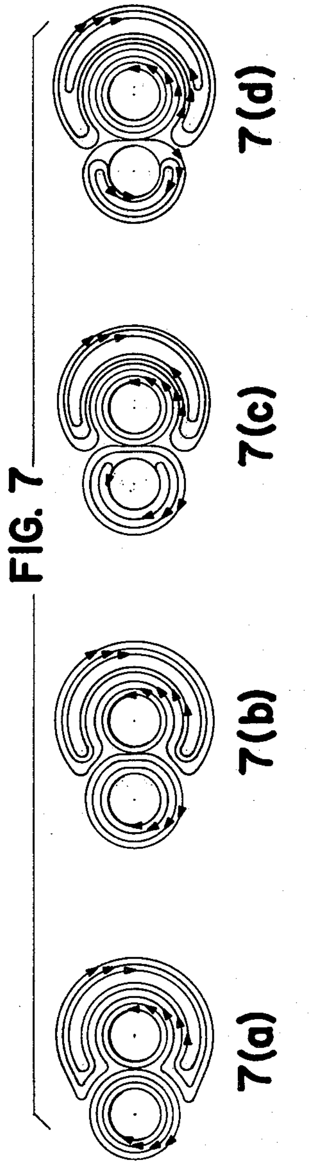
Figure 5:
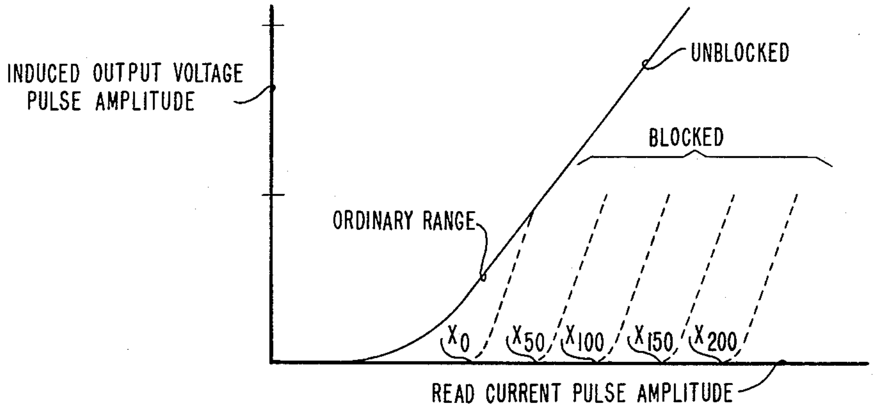
Figure 6:
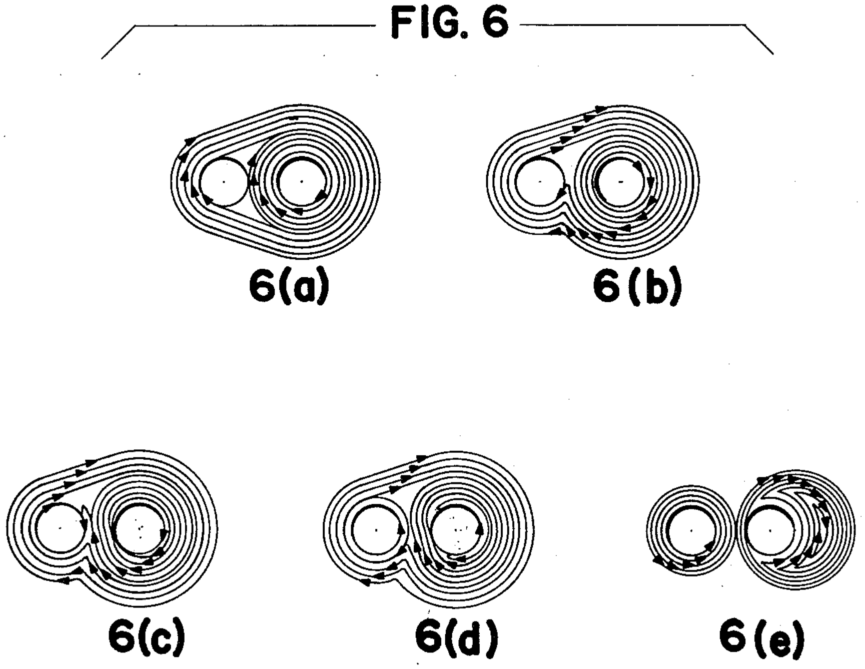

FIGS. 2(*a*) to 2(*h*) show corresponding flux patterns; illustrating the operation of the teachings of the co-pending application in both the low and high reluctance conditions;

FIG. 3 shows a responsive-excitation curve between the read and sense windings passed through the read aperture of FIG. 1 for each of the two stable reluctance conditions;

FIG. 4 shows a plot of the magnetic coupling between the read and sense windings of FIG. 1 as a function of the magnitude current applied through the control winding. For the curve labeled "Increasing Reluctance," the current pulse applied to the control winding is of one polarity. For the curve labeled "Decreasing Reluctance," the current applied to the control winding is of the other polarity;

FIG. 5 is a graph showing the functional relationship of the amplitude of the induced output voltage in the sense winding 14 with respect to the amplitude of the current pulses being applied to read winding 13 for both the blocked and unblocked conditions of the magnetic device for the purpose of illustrating the advantages which accrue from the teachings of the present invention;

FIG. 6, which includes FIGS. 6(*a*) to 6(*e*), shows flux patterns illustrating the unblocking action commencing at the destructibility threshold of the magnetic device of FIG. 1 by the application of current pulses to the read winding 13 having a polarity which acts to supersaturate the magnetic material between the read and control apertures;

FIG. 7, which includes FIGS. 7(*a*) to 7(*d*), shows flux patterns illustrating the reflex blocking action of the magnetic device of FIG. 1 commencing at the reflex break point when the amplitude of the current applied to the control winding 15 for the purpose of *unblocking* the magnetic device becomes sufficiently large to supersaturate the magnetic material between the read and control apertures; and FIG. 8 shows the illustrative modification of the magnetic device of FIG. 1 to obtain the advantages of the teachings of the present invention.

An unbounded slab 10 of magnetic material is shown in FIG. 1. Passing through slab 10 are two apertures 11 and 12 having substantially the same diameter. Designating aperture 11 as a read aperture, a read winding 13 is passed therethrough. Also passing through read aperture 11 is a sense winding 14. Finally, a control winding 15 is shown passing through aperture 12 designated as the control aperture.

For the purpose of passing alternate bipolar current pulses through read winding 13, a bipolar current driver 16 is shown connected thereto. Similarly, a bipolar current driver 17 is shown connected to control winding 15 for passing alternate bipolar current pulses therethrough. Current drivers 16 and 17 may be of conventional construction.

Referring now to FIG. 2, the remanent flux pattern (*a*) shows an exemplary unblocked reluctance condition for the magnetic device of FIG. 1. Assuming that the read winding 13 has a current pulse applied thereto by driver 16 having a magnitude and polarity shown by current pulse (1), a counterclockwise flux is generated around read aperture 11 with a remanent condition illustrated by a flux pattern 2(*b*). Because the flux around read aperture 11 has been reversed, a voltage pulse (1′) is induced within sense winding 14 having a polarity which is defined and shown as negative. Similarly, when a negative current pulse (2) is applied to winding 13 by driver 16, the flux around read aperture 11 is reversed with a remanent condition shown in flux pattern 2(*c*). As a result of this reversal of flux, sense winding 14 has a voltage pulse (2′) induced therein having a polarity which is defined and shown as positive. Next, a positive pulse (3) acts to reverse the flux around read aperture 11, as shown in flux pattern 2(*d*) and induces a negative voltage pulse (3′) in sense winding 14. Then, a current pulse (4) applied to read winding 13 again reverses the remanent flux around read aperture 11, as shown in flux pattern 2(*e*) so as to derive an induced positive voltage pulse (4′) in sense winding 14.

Accordingly, a transformer action exists between read winding 13 and sense winding 14 representing a stable low reluctance (coercive) condition around read aperture 11. The magnetic flux condition around control aperture 12 plays no part in determining the voltage induced in sense winding because it forms a kidney pattern around the control aperture as shown in flux patterns 2(*a*)–2(*e*). By definition, the existence of this stable low reluctance condition between the read winding 13 and the sense winding 14 passing through read aperture 11 may be considered as representative of a first binary digital state.

In order that the magnetic device of FIG. 1 be switched to its other high reluctance (coercive) condition, a negative current pulse (5) is applied to control winding 15 so as to generate a clockwise flux around control aperture 12, as shown in flux pattern 2(*f*). As a result of the application of the control magnetomotive force, the flux within the inner leg (magnetic material between the two apertures) is reversed in direction and the flux which previously encircled read aperture 11 only now encircles both read aperture 11 and control aperture 12.

It should be noted that the amplitude of the current pulse applied to control winding 15 need only be sufficient to derive a saturation flux, which will extend through the area between the apertures (inner leg) because care was taken to select the polarity of the control current pulse to derive flux having the same direction as the flux in the outer leg around read aperture 11. Since the amplitude of the current pulse applied to the control winding is small, the circular remanent flux pattern around control aperture 12 in combination with the modified flux pattern around aperture 11 appears like a pulley. This modified flux pattern ("pulley pattern") represents the minimum active area of the ferrite slab 10, which is required to represent this stable magnetic reluctance state. By reason of the fact that each leg adjacent read aperture 11 is saturated in the same direction and the fact that the reluctance of the flux path, which now extends around the "pulley pattern," is higher, a current pulse applied to read winding 13, which was previously adequate, will no longer reverse the flux around aperture 11, so as to induce a voltage in sense winding 14.

For example, again referring to FIG. 2, if a positive current pulse (6) is applied to read winding 13 when the flux pattern 2(*f*) is present in the magnetic material around apertures 11 and 12, a very small or zero voltage (6′) is induced in read winding 14 as shown because of the aforementioned blocking action. As noted in FIG. 2, flux pattern 2(*g*) remains the same as flux pattern 2(*f*). Similarly, if a negative current pulse (7) is applied to read winding 13, a very small voltage (7′) or zero voltage is induced in sense winding 14 and the flux pattern 2(*h*) remains substantially the same as flux patterns 2(*f*) and 2(*g*). These latter flux patterns are representative of the aforementioned pulley pattern and may be characterized as one binary digital state such as "0."

FIG. 3 shows a response-excitation curve between read and sense windings 13 and 14, respectively, for each of the two stable reluctance coercivity conditions. When the magnetic device of FIG. 1 is in its unblocked condition represented by flux patterns 2(*a*) through 2(*c*) of FIG. 2, the alternate bipolar current pulses applied to read winding 13 successively reverses the flux around the read aperture 11 following a hysteresis loop shown by the solid line of FIG. 3 so as to induce voltages of proper polarity in sense winding 14. However, when the magnetic device of FIG. 1 is placed in its blocked condition. represented by the polarity pattern shown by flux patterns 2(*f*) through 2(*h*), the alternative bipolar current pulses (6) and (7) applied to read winding 13 are insufficient in amplitude to cause the flux around aperture 11 to reverse and follow the flux-excitation characteristic shown in FIG. 3 by the dashed lines. Since this produces no flux change about the read aperture 11 (or very small flux change) no voltage (or a very small voltage) is induced in sense winding 14 by current pulses (6) and (7).

Thus, the magnetomotive force applied by control winding 15 determines whether read winding 13 and sense winding 14 have a transformer-type coupling. When flux patterns 2(*a*) through 2(*e*) are present, the device may be said to be in a one state and when flux patterns 2(*f*) through 2(*g*) are present, the device may be said to be in a zero state. In order for the device to be returned from flux pattern 2(*h*) to that of 2(*a*), representing the unblocked reluctance condition, a current pulse (8) having the polarity shown is applied to control winding 15, so as to derive a magnetomotive force and flux to oppose the flux in the center leg of the device between apertures 11 and 12. The amplitude of current pulse (8) is selected to generate flux in the magnetic material adjacent the control aperture 12 extending almost to the nearest edge of read aperture 11.

While FIG. 3 shows the response-excitation characteristic of the magnetic device of FIG. 1 as it appears from the read aperture 11 with respect to the coupling between read and sense windings 13 and 14, respectively, FIG. 4 graphically illustrates the relationship between the presence of the transformer coupling and the amplitude of the control pulse. A solid line is used to illustrate the action of a control current pulse such as (5) of FIG. 2 in driving the magnetic device from the unblocked to the blocked conditon representing the transition from maximum to minimum coupling between the read and sense windings 13 and 14. Similarly, a dashed line is used to illustrate the action of a control current pulse such as (8) of FIG. 2 in driving the magnetic device from the blocked to unblocked condition representing the transition from minimum to maximum coupling between the read and sense windings 13 and 14, respectively.

Referring again to the solid line and assuming the device to be in an unblocked condition, the break point $I_{ris}$ represents the amplitude of the control current pulse (5) at which the magnetomotive force is just sufficient to start blocking the read aperture 11. This break point is determined by the diameter of the control aperture 12, the switching coercivity of the magnetic material, the distance between the read and control apertures 11 and 12, and is relatively independent of the amplitude of the current pulse applied to read winding 13 prior to initiating the blocking control pulse. Similarly, point $I_{rif}$ represents the amplitude of control pulse (5) at which the reluctance increase is completed corresponding to the blocked condition. The amplitude of the current pulse applied to the control winding at which point $I_{rif}$ occurs is determined by the distance between apertures 11 and 12, the diameter of the control aperture 12, and the switching coercivity of the magnetic material. The slope of the solid line adjoining points $I_{ris}$ and $I_{rif}$ is virtually independent of geometrical considerations and depends on the homogeneity of the magnetic material.

Referring again to the dashed line and assuming the device to be in the blocked condition, the break point $I_{rds}$ represents the amplitude of the control current pulse at which the magnetomotive force is just sufficient to start unblocking the read aperture 11. It should be noted that the control current pulse applied to the unblocked device is of opposite polarity to that which is used to block the device. Referring to FIG. 2, this control current pulse is represented by pulse (8). This break point $I_{rds}$ is determined by the diameter of the control aperture 12 and the switching coercivity of the magnetic material and is *independent* of the separation distance between the read and control apertures 11 and 12, respectively. Similarly, the break point $I_{rdf}$ represents the amplitude of the control current pulse (8) at which the reluctance decrease is completed corresponding to the unblocked condition. The amplitude of current pulse (8) at which point $I_{rdf}$ occurs is determined by the separation distance between the read and control apertures 11 and 12, the diameter of the control aperture 12, and the switching coercivity of the magnetic material. Moreover, the shape of the transient path of the dashed line between points $I_{rds}$ and $I_{rdf}$ is a function of the diameter of the control aperture, and the separation distance of the aperture. Specifically, the slope of the transient path decreases as the separation distance between the read and control apertures increases.

Point $I_{rb}$ represents the reflex break point where the amplitude of the control pulse exceeds that which has been effective to unblock the read aperture 11 by an amount sufficient to supersaturate the magnetic material between the read and control apertures 11 and 12 such as to commence blocking the magnetic material around the read aperture by reason of the reflex switching (kidney pattern) which begins to occur at the remote side of the inner wall of the read aperture 11.

Referring now to FIG. 5, there is described the functional relationship of the amplitude of the induced output voltage (ordinate) with respect to the amplitude of the current pulses (abscissa) being applied to the read winding 13 for both the blocked and unblocked conditions. The solid line represents this relationship during the unblocked condition whereas the dashed line further marked as "0" bias represents this relationship during the blocked condition. The point $X_0$ along the abscissa of FIG. 5 at which point the dashed line increases its slope sharply represents the destructibility threshold corresponding to the amplitude of the read current pulse which is just sufficient to start unblocking the magnetic material around the read aperture 11. For example, referring back to FIG. 3, the amplitude of the read current pulse (producing supersaturation in the central leg) is just sufficient to exceed the magnetomotive force threshold represented by point $X_0$ on the dashed response-excitation curve shown. As will be discussed hereinafter, the destruction of the blocked condition is the result of the magnetomotive force generated by the read current pulse having the proper polarity to supersaturate the magnetic material between the read and control apertures 11 and 12. Therefore, as seen from FIG. 5, the amplitude of the read current pulse applied to read winding 13 of FIG. 1 while the device is in its blocked condition must be less than the destructibility threshold shown. Accordingly, the amplitude of alternate bipolar read current pulses must ordinarily be kept in a range to provide a usable induced voltage in the sense winding 14 in response to a read current pulse when the device is in its unblocked condition as represented by the solid line of FIG. 5 and yet the amplitude of these pulses must not exceed the destructibility threshold shown by point $X_0$.

Since the ordinate of FIG. 5 represents the magnitude of the induced output voltage in sense winding 14 resulting from a particular amplitude of read current pulse applied to read winding 13, it should be clear from inspection that the ordinary operating range to obtain a desirable output signal when the device is in its unblocked condition and not exceed the destructibility threshold represented by point $X_0$ is extremely limited. The desired output signal is small and the chance of destroying a blocked condition stored in the magnetic device of FIG. 1 is great. While close control may be exercised on the amplitude of the alternate bipolar pulses being applied to read winding 13 by using a substantial amount of extra electronic components, the output signal obtained during the unblocked condition of the magnetic device may still be unusally small. This is an inherent shortcoming of the magnetic device of FIG. 1.

Hereinabove, reference has been made to point $X_0$ representing the destructibility threshold corresponding to the amplitude of the read current pulse, which is sufficient to start driving the magnetic device from its blocked condition to its unblocked condition and thereby undesirably destroying the stored digital state. The flux patterns of FIG. 6 are shown for the purpose of describing the details of this undesirable destruction of the stored blocked magnetic condition. Flux pattern 6(*a*) represents the blocked condition of the magnetic device of FIG. 1 and corresponds to flux patterns 2(*f*)–2(*h*) already described. This flux pattern depicts the instantaneous condition when there is no magnetomotive force being generated by the read winding 13 of FIG. 1 by reason of a current passing therethrough. However, assuming the application of a current pulse applied to read winding 13 having a polarity to generate counterclockwise flux around read aperture 11, the flux pattern 6(*a*) is instantaneously modified inasmuch as the magnetic material between the read aperture 11 and control aperture 12 will tend to become supersaturated with a resultant pinching of flux lines. Flux pattern 6(*b*) shows this pinching effect when the amplitude of the current pulse applied to the read winding 13 is less than the destructibility threshold. Similarly, flux pattern 6(*c*) illustrates the pinching of the flux by reason of supersaturation as the amplitude of the current pulse applied to read winding 13 is increased and is still below that equal to the destructibility threshold point $X_0$. When the destructibility threshold is reached by the amplitude of the current pulse applied to the read winding, the flux pattern 6(*d*) illustrates the beginning of the modification of the blocked condition. By reason of the fact that the magnetic material between read aperture 11 and control aperture 12 becomes greatly supersaturated, the flux circling the control aperture finds that the lowest reluctance path corresponds to a folding back (inner wall reflex switching) in the magnetic material at the remote side and in the inner wall of the control aperture 12. Note that in flux pattern 6(*d*) some flux is shown encircling the read aperture only since the flux folding back (being reflex switched) allows room. This corresponds to the beginning of the unblocked condition. Flux pattern 6(*e*) shows the resultant unblocked condition when the amplitude of the read pulse substantially exceeds the read destructibility threshold $X_0$. Note that a substantial amount of flux formerly encircling the control aperture now folds back on itself forming a kidney pattern and that a substantial amount of flux encircles the read aperture only, thereby unblocking the magnetic device of FIG. 1.

It should be noted that the unblocking action begins only after the flux at the inner wall of the control aperture reflex switches to form a kidney flux pattern in the magnetic material at the remote edge of the inner wall. Since this represents the beginning of the unblocking action of the magnetic material around the read aperture 11, it is a fundamental part of the teaching of the present invention and that this action must occur first. Furthermore, if the beginning of the reflex switching is controlled, the unblocking action can be avoided when it is undesirable.

Hereinabove in FIG. 4 reference has been made to the reflex break point $I_{rb}$ defined as the amplitude of the current pulse applied to the control winding 15 which exceeds that necessary to drive the magnetic device of FIG. 1 to its unblocked condition by an amount sufficient to supersaturate the magnetic material between the read and control apertures 11 and 12 such as to commence reflex switching (folding back of flux) the magnetic material in the remote inner wall of the read aperture 11 to form a kidney flux pattern. Since this reflex switching decreases the amount of flux encircling the read aperture 11, this action electrically resembles the normal blocked condition. The flux patterns of FIG. 7 illustrate this reflex switching and blocking action when the amplitude of the pulse applied to the control winding substantially exceeds that which was originally effective to unblock the magnetic device of FIG. 1. Flux pattern 7(*a*) illustrates the flux pattern of the magnetic device following the application of a control pulse of a polarity and amplitude just sufficient to exceed point $I_{rdf}$ (same as flux pattern 2(*a*)). If, however, the control current pulse is increased in amplitude, the resultant magnetomotive force will generate flux in the magnetic material between the two apertures in the same direction as the residual flux around the read aperture tending to supersaturate and increase the reluctance of that magnetic material by virtue of the reflex switching taking place at the inner wall of the read aperture. Flux pattern 7(*b*) illustrates this supersaturation action. Flux pattern 7(*c*) illustrates the condition when the amplitude of the current pulse applied to the control winding 15 exceeds point $I_{rb}$ the reluctance in magnetic material between the read and control apertures 11 and 12 has increased to the point that the residual flux around the read aperture 11 commences to fold back (reflex switch) on itself forming a kidney pattern. The amount of flux encircling the read aperture 11 only has been substantially decreased. Flux pattern 7(*d*) shows the condition where the amplitude of the current pulse applied to the control winding substantially exceeds point $I_{rb}$ and very little flux continues to encircle read aperture 11 only such that the unblocked condition is substantially destroyed.

It should be noted that the blocking action begins only after the flux at the inner wall of the read aperture reflex switches to form a kidney flux pattern in the magnetic material at the remote edge of the inner wall. Thus, if the beginning of the reflex switching is controlled, the blocking action can be avoided when it is undesirable.

Referring to FIG. 4 and more particularly to the dashed lines representing the transition of the magnetic device from its blocked condition to its unblocked condition as a function of the amplitude of the current pulse applied to control winding 15, another shortcoming is represented by the location of the reflex break point $I_{rb}$ and the location of point $I_{rdf}$. When the magnetic device of FIG. 1 is used in a coincident current matrix, engineering application partial selection may be represented by a resultant current pulse applied to the control winding having an amplitude which does not exceed either point $I_{rds}$ or $I_{ris}$. Yet when it is desired to fully select the magnetic device exemplified by FIG. 1, the current pulse of proper polarity being applied to control winding 15 must have a resultant amplitude which exceeds points $I_{rds}$, $I_{rdf}$, $I_{ris}$ and $I_{rif}$ and yet not exceed the point $I_{rb}$. Since coincident current selection techniques often depend upon the partial selection corresponding to a current amplitude I and full selection on an amplitude corresponding to 2I, the locations of points $I_{rdf}$, $I_{rif}$, and $I_{rb}$ are critical. In summary, the amplitude of the control current pulse corresponding to 2I must exceed points $I_{rdf}$, and $I_{rif}$ and yet not exceed point $I_{rb}$.

Referring again to FIG. 4, it should be noted that points $I_{rdf}$ and $I_{rb}$ are relatively close together and any resultant current amplitude applied to the control winding 15 which is sufficient to exceed $I_{rdf}$ and $I_{rif}$ could well exceed the point $I_{rb}$ unless extreme care is taken to regulate the amplitude of the resultant control current pulse.

The close amplitude regulation of the current pulses applied to control winding 15 would, of course, require a substantial number of electronic components. In view of the shortcomings of the magnetic device of FIG. 1 and which is the subject matter of the aforementioned patent application Serial No. 823,525, the objects of the present invention are obtained by modifying FIG. 1 as shown in FIG. 8. By inspection, it should be clear that FIG. 8 differs from FIG. 1 by the passage of a biasing winding 30 through the control aperture 12. Connected to biasing winding 30 is a conventional current source 31. In addition, a biasing winding 32 is passed through read aperture 11 and is connected to a conventional current source 33.

During the reading operation of the magnetic device of FIG. 8, the destructibility threshold point $X_0$ of FIGS. 3 and 5 may be moved to the right by appropriately applying a biasing current to the biasing winding 30. This is shown by the family of dotted curves in FIGS. 3 and 5. As indicated in FIG. 5, the current source 31 applies a current through biasing winding 30 which generates a magnetomotive force around the inner wall of the control aperture 12 in a direction opposing the folding or reflex switching of the flux at the remote edge. This magnetomotive force tends to aid in the preservation of the blocked condition of the magnetic device (exemplified by the flux pattern 2(*g*)) and increases the amplitude of the current pulse required to be applied to the read winding 13 which would be sufficient to destroy the blocked condition. This bias referred to as inner wall bias increases the read destructibility threshold by an amount essentially equal to the bias amplitude. FIG. 6, described hereinabove, depicts this destructive process. The greater the amplitude of the biasing current applied to biasing winding 30, the greater the amplitude of the current pulse applied to the read winding 13 has to be to exceed the destructibility threshold point ($X_0$–$X_{200}$). In FIGS. 3 and 5 points $X_0$, $X_{50}$, $X_{100}$, $X_{150}$ and $X_{200}$ represent the modification of the destructibility threshold by the application 0, 50, 100, 150 and 200 milliamperes of inner wall bias to bias winding 30. In this exemplary embodiment of the present invention 200 milliamperes represents the bias level which by itself will produce irreversible switching within the magnetic material of the inner wall. This bias level is often referred to as the inner wall switching threshold. In practicing the teachings of the present invention this inner wall bias should not exceed the inner wall switching threshold. This inner wall bias control in the destructibility threshold is essentially linear and unity until it reaches the inner wall switching threshold. Within reasonable limits, the biasing of the magnetic material around control aperture 12 has no effect on the characteristic of FIG. 5 when the magnetic device is in the unblocked condition because the flux being switched around read aperture 11 does not also encircle the control aperture 12 during the unblocked condition and the inner wall biasing does not actually switch flux. (Note that during the blocked condition, the flux around read aperture 11 also encircles the control aperture 12.) Accordingly, the dashed characteristic of FIG. 5, representing the blocked condition, is moved to the right by the biasing techniques. Thus, by following the teachings of the present invention, the amplitude of the alternative bipolar current pulses being applied to read winding 13 by current source 16 may be made greater by an amount equal to the inner wall bias, without exceeding the destructibility threshold represented by point X and the output signal induced in sense winding 14 will be greater and more usable.

As a result there is a substantial improvement in the "one/zero" signal which may be obtained during the nondestructive interrogation of the binary digital state being stored in the magnetic storage device. Moreover, because the amplitude of the alternate bipolar current pulses being applied to the read winding 13 may be increased, the time required to interrogate the device (access time) is decreased.

During the controlling operation, the reflex break point $I_{rb}$ of FIG. 4 may also be moved to the right by appropriately applying a biasing current to the biasing winding 32 for the purpose of inner wall biasing read aperture 11. This is shown by the family of dotted curves in FIG. 4. Thus, during the control operation, current source 33 is used to apply a current through biasing winding 32 which generates a magnetomotive force around the inner wall of read aperture 11 in a direction opposing the folding or reflex switching of the flux at the remote edge of the read aperture. This magnetomotive force tends to aid in the preservation of the unblocked condition of the magnetic device exemplified by the flux pattern 2(*a*) of FIG. 2 and increase the amplitude of the current pulse ($I_{rb}$) applied to the control winding 15 which would be sufficient to destroy the unblocked condition by an amount essentially equal to the inner wall bias applied to the read aperture. FIG. 7 described hereinabove depicts this destructive process. The greater the amplitude of the biasing applied to the biasing winding 32, the greater the amplitude of the current pulse applied to the control winding 15 can be prior to exceeding the reflex break point $I_{rb}$. In summary, the greater the biasing of the magnetic material around inner wall of the read aperture, the more the point $I_{rb}$ moves to the right in FIG. 4. The amplitude of this bias, however, should not exceed the inner wall switching threshold of the aperture biased. Several exemplary curves are shown in FIG. 4 to illustrate this feature.

The teachings of the present invention as described hereinabove with a background of the inherent problems of a magnetic device of the type described and shown in FIG. 1 provides a means for greatly enhancing the operational characteristics of that device by properly biasing the magnetic material of the inner wall around the control aperture during the reading operation. The transformer-type action or lack of it between the read and sense windings passing through the read aperture 11, depending on whether the device is in the unblocked or blocked conditions, respectively, is greatly improved by using inner wall biasing since a usable signal to noise ratio is obtained and the amplitude of the alternate bipolar current pulses being applied to the read winding need not be controlled. Moreover, the amplitude of inducing voltage pulses indicating an unblocked condition is considerably increased.

Similarly, biasing the magnetic material around the inner wall of the read aperture during the control operation moves the reflex break point $I_{rb}$ out to the right on FIG. 4 so that the resultant amplitude of the current pulse applied to the control winding need not be controlled with great accuracy to assure that it exceeds the amplitude corresponding to both the points $I_{rdf}$ and $I_{rif}$ and yet not exceed point $I_{rb}$. More specifically, the separation distance between the read and control apertures 11 and 12, the switching coercivity of the magnetic material and the diameter of the control aperture may be selected so that substantially equal amplitudes of the current pulse passing through the control winding 15 will exceed the points $I_{rdf}$ and $I_{rif}$ and yet not be greater than twice the amplitude of current passing through the control winding corresponding to the points $I_{ris}$ and $I_{rds}$. If this latter requirement were not met, the magnetic device of FIG. 8 would not work properly as an element in a coincident current selection matrix. Besides the amplitude of the bipolar current pulses applied to the control winding for performing the control function may be of the same magnitude.

As one skilled in the art will recognize from the above discussion, the selection and control of the destructibility threshold point X and points $I_{ris}$, $I_{rif}$, $I_{rds}$, $I_{rdf}$ and $I_{rb}$ represent significant design parameters which can be a determining factor in the construction of an improved magnetic device having two magnetic reluctance (coercive) conditions wherein each stable state may be interrogated without changing that state. Mechanical techniques alone, without the use of inner wall bias in either the read or control aperture (or both), according to the teachings of the present invention, do not provide adequate design parameters for an adequate magnetic storage device of the type described. Furthermore, the magnetic device as described can be constructed to be readily usable in a coincident current selection matrix application exemplified by the binary digital memory.

While FIG. 8 shows a single read winding 13, it should be clear that plural windings may be used in its place for generating a resultant magnetomotive force as required by the particular engineering application. Moreover, although a separate biasing winding 32 (including source 33) has been shown, for the purpose of providing inner wall bias to the read aperture, the particular engineering application of the teachings of the present invention may utilize the read winding (or plural read windings) for that purpose since the magnetic device will probably not be interrogated while its state is being modified during the control operation. Similarly, although one control winding 15 is shown in FIG. 8, it should be clear that mor than one winding may be used for that purpose by generating a resultant magnetomotive force as required by the particular engineering application and that a control winding (or plural control windings) may be used in place of biasing winding 30 since the stable magnetic reluctance condition of the magnetic device normally would not be changed during the reading operation. Another modification from FIG. 8 that may be made is that biasing to determine the destructibility threshold point X and biasing to determine the reflex break point $I_{rb}$ may not necessarily be used in the same engineering application. It should also be understood that while FIG. 8 shows the read and control apertures as round, it should be clear that they may be oblong or another shape (or different shapes) as long as they have substantially the same perimeter distance (inner wall) and reluctance path length. Moreover, the biasing current may either be of a current level or pulse type.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A magnetic storage device comprising a quantity of magnetizable material and having at least one pair of apertures passing therethrough, each pair of apertures and the immediately surrounding magnetizable material forming a bistable storage device, each of said apertures of a pair having approximately the same inner perimeter, one of said apertures acting as a read aperture having energizing winding means and sense winding means passig therethrough, said other aperture acting as a control aperture having energizing winding means passing therethrough, the magnetizable material around said aperture pair representing a first binary digital state when the remanent flux passing around said read aperture does not also encircle said control aperture, the magnetizable material around said aperture pair representing the second binary digital state when the remanent flux disposed about said read aperture also encircles said control aperture, means for simultaneously applying current through said energizing winding means of said read and control apertures when switching said storage device from one binary digital state to the other and when nondestructively interrogating the binary digital state of said device.

2. A magnetic storage device comprising a quantity of magnetizable material and having at least one pair of apertures passing therethrough, each pair of apertures and the immediately surrounding magnetizable material forming a bistable storage device, each of said apertures of a pair having approximately the same inner perimeter, one of said apertures acting as a read aperture having energizing winding means and sense winding means passing therethrough, said other aperture acting as a control aperture having energizing winding means passing therethrough, the magnetizable material around said aperture pair representing a first binary digital state when the remanent flux passing around said read aperture does not also encircle said control aperture, the magnetizable material around said aperture pair representing the second binary digital state when the remanent flux disposed about said read aperture also encircles said control aperture, means for simultaneously applying current through said energizing winding means of said read and control apertures when nondestructively interrogating the binary digital state of said device.

3. A magnetic storage device comprising a quantity of magnetizable material and having at least one pair of apertures passing therethrough, each pair of apertures and the immediately surrounding magnetizable material forming a bistable storage device, each of said apertures of a pair having approximately the same inner perimeter, one of said apertures acting as a read aperture having energizing winding means and sense winding means passing therethrough, said other aperture acting as a control aperture having energizing winding means passing therethrough, the magnetizable material around said aperture pair representing a first binary digital state when the remanent flux passing around said read aperture does not also encircle said control aperture, the magnetizable material around said aperture pair representing the second binary digital state when the remanent flux disposed about said read aperture also encircles said control aperture, means for simultaneously applying current through said energizing winding means of said read and control apertures when switching said storage device from the second binary digital state to the other.

4. A magnetic storage device comprising a slab of magnetizable material and having at least one pair of apertures passing therethrough, each pair of apertures and the immediately surrounding magnetizable material forming a bistable storage device, each of said apertures of a pair having approximately the same inner perimeter, one of said apertures acting as a read aperture having energizing winding means and sense winding means passing therethrough, said other aperture acting as a control aperture having energizing winding means passing therethrough, the magnetizable material around said aperture pair representing a first binary digital state when the remanent flux passing around said read aperture does not also encircle said control aperture, the magnetizable material around said aperture pair representing the second binary digital state when the remanent flux disposed about said read aperture also encircles said control aperture, said magnetizable material being switched from said second binary state to said first binary state by the application of a current pulse to said energizing winding means passing through said control aperture, means for the simultaneous application of a current bias to said energizing means passing through said read aperture acting to minimize the required regulation of the amplitude of the current pulse being applied through said control aperture.

5. A magnetic device comprising a slab of magnetizable material having a high rectangular hysteresis loop with square knees and having at least one pair of apertures having approximately the same diameter, each pair of apertures and the immediately surrounding magnetizable material forming a bistable storage device, one of said apertures having separate read and sense winding means passing therethrough, said other aperture having bias winding means passing therethrough, the magnetizable material around said aperture pair representing a first binary digital state when the remanent flux passing around said aperture containing said read and sense winding means does not also encircle said aperture containing said bias winding means, the magnetic material around said aperture pair representing the other binary digital state when the remanent flux disposed around said aperture containing said read and sense winding means also encircles said aperture containing said bias winding means, a source of alternate bipolar current pulses connected for selective application to said read winding means, a source of bipolar current pulses connected for selective application to said bias winding means, during said first binary digital state said alternate bipolar current pulses applied to said read winding means inducing voltage pulses in said sense winding means, during said other binary digital state said bipolar current pulses being ineffective to induce voltage pulses within said sense winding, said source of biasing current being selectively applied to said bias winding means during said reading operation of a polarity so that the amplitude of said alternate bipolar current pulses applied to said reading winding may be relatively large so as to provide large induced voltage pulses within the said sense winding during said first binary digital state and at the same time not destroy said other binary state.

6. A magnetic device comprising of magnetizable material having a high rectangular hysteresis loop with square knees having at least one pair of apertures having approximately the same diameter, each pair of apertures and the immediately surrounding magnetizable material forming a bistable storage device, one of said apertures having separate read and sense winding means passing therethrough, said other aperture having bias winding means passing therethrough, the magnetizable material around said aperture pair representing a first binary digital state when the remanent flux passing around said aperture containing said read and sense winding means does not also encircle said aperture containing said bias winding means, the magnetic material around said aperture pair representing the other binary digital state when the remanent flux disposed around said aperture containing said read and sense winding means also encircles said aperture containing said bias winding means, a source of alternate bipolar current pulses connected for selective application to said read winding means, a source of bipolar current pulses connected for selective application to said bias winding means, during said first binary digital state said alternate bipolar current pulses applied to said read winding means inducing voltage pulses in said sense winding means, during said other binary digital state said bipolar current pulses being ineffective to induce voltage pulses within said sense winding means, said source of biasing current being selectively applied to said bias winding means during said reading operation of a polarity so that the amplitude of said bipolar current pulses applied to said read winding may be relatively large so as to provide large induced voltage pulses within the said sense winding during said first binary digital state and at the same time not destroy said other binary digital state, the magnetizable material around said aperture pair being driven to said other binary digital state from said first binary digital state by always applying a current pulse in said bias winding means having the proper polarity necessary to derive flux around said aperture containing said bias winding means in a direction so as to oppose the existing remanent flux within the magnetizable material between said apertures and the magnetizable material around said aperture pair being placed in the first binary digital state by a current pulse being applied to said bias winding means having an opposite polarity to said previous bias current pulse.

7. A magnetic device comprising a slab of magnetizable material and having at least one pair of apertures passing therethrough, each pair of apertures and the immediately surrounding magnetizable material forming a bistable storage device, each of said apertures of a pair having approximately the same inner perimeter, one of said apertures acting as a read aperture having a biasing winding means passing therethrough, said other aperture acting as a control aperture having control winding means passing therethrough, the magnetizable material around said aperture pair representing a first binary digital state when the remanent flux passing around said read aperture does not also encircle said control aperture, the magnetizable material around said aperture pair representing the other binary digital state when the remanent flux disposed about said read aperture also encircles said control aperture, a source of energization for selective application to said control winding means, a source of energization for selective application to said biasing winding means, said control winding means acting to switch the magnetic material around said aperture pair from said first binary digital state to the other and vice versa, said read and biasing winding means being selectively energized simultaneously with said energization of said control winding means with an amplitude and polarity to minimize the tolerance to which the energization of said control winding must be maintained and at the same time prevent an undesired switching of the device from the first binary digital state.

8. A magnetic device comprising a slab of magnetizable material and having at least one pair of apertures passing therethrough, each pair of apertures and the immediately surrounding magnetizable material forming a bistable storage device, each of said apertures of a pair having approximately the same inner perimeter, one of said apertures acting as a read aperture having read and biasing winding means and sense winding means passing therethrough, said other aperture acting as a control aperture having control and bias winding means passing therethrough, the magnetic material around said aperture pair representing a first binary digital state when the remanent flux passing around said read aperture does not also encircle said control aperture, the magnetic material around said aperture pair representing the other binary digital state when the remanent flux disposed about said read aperture also encircles said control aperture, a current source for selective energization of said control and bias winding means, a current source for selective energization of said read and biasing winding means, during said first binary digital state appropriate energization of read winding means acting to induce voltage pulses within said sense winding means, during said other binary digital state said appropriate energization of said read winding means being ineffective to induce voltage pulses within said sense winding means, said source of biasing current being selectively applied to said bias winding means during said reading operation with an amplitude and polarity so that the amplitude of said energization applied to said read winding means may be relatively large to provide large induced voltages within said sense winding means during said first binary digital state and at the same time not destroy said other binary digital state, said source of selective energization of said control winding means acting to switch the magnetic material around said aperture pair from the first binary digital state to the other and vice versa, said source connected to said biasing winding means in said read operation acting to bias the inner wall of said read aperture with an amplitude and polarity to minimize the tolerance to which the energization of said control winding means must be maintained and at the same time prevent an undesired switching of the device from the first binary digital state.

References Cited by the Examiner

UNITED STATES PATENTS

| | | | |
|---|---|---|---|
| 2,869,112 | 1/59 | Hunter | 340—174 |
| 2,911,628 | 11/59 | Briggs et al. | 340—174 |
| 2,923,923 | 2/60 | Raker | 340—174 |

OTHER REFERENCES

Publication: "Multihole Ferrite Core Configurations and Applications," by H. W. Abbott and J. J. Suran, published in Proceedings of the I.R.E., vol. 45, No. 8, August 1957, pp. 1081–1093.

IRVING L. SRAGOW, *Primary Examiner.*